United States Patent [19]
Bourquin

[11] Patent Number: 5,799,284
[45] Date of Patent: Aug. 25, 1998

[54] SOFTWARE AND HARDWARE FOR PUBLISHING AND VIEWING PRODUCTS AND SERVICES FOR SALE

[75] Inventor: Roy E. Bourquin, 1361 White Rock Way, Antioch, Calif. 94509

[73] Assignee: Roy E. Bourquin, Antioch, Calif.

[21] Appl. No.: 614,669

[22] Filed: Mar. 13, 1996

[51] Int. Cl.$^6$ .................................................. G06F 15/22
[52] U.S. Cl. ........................................ 705/26; 705/27
[58] Field of Search ............................. 705/26, 27, 28, 705/29, 22

[56] References Cited

U.S. PATENT DOCUMENTS

| | | | |
|---|---|---|---|
| 4,076,961 | 2/1978 | Holsinger et al. | 179/2 |
| 4,751,635 | 6/1988 | Kret | 364/200 |
| 4,811,207 | 3/1989 | Hikita et al. | 364/200 |
| 4,831,582 | 5/1989 | Miller et al. | 364/900 |
| 4,932,826 | 6/1990 | Moy et al. | 414/277 |
| 4,992,940 | 2/1991 | Dworkin | 364/401 |
| 5,155,847 | 10/1992 | Kirouac et al. | 395/600 |
| 5,179,660 | 1/1993 | Devany et al. | 395/200 |
| 5,319,542 | 6/1994 | King, Jr. et al. | 364/401 |
| 5,379,421 | 1/1995 | Palazzi, III et al. | 395/600 |
| 5,396,417 | 3/1995 | Burks et al. | 364/401 |
| 5,398,336 | 3/1995 | Tantry et al. | 395/600 |
| 5,530,852 | 6/1996 | Meske, Jr. et al. | 395/600 |
| 5,572,643 | 11/1996 | Judson | 395/793 |
| 5,625,818 | 4/1997 | Zarner et al. | 395/615 |
| 5,664,111 | 9/1997 | Nahan et al. | 705/27 |
| 5,694,546 | 12/1997 | Reisman | 395/200.9 |
| 5,696,965 | 12/1997 | Dedrick | 395/610 |

OTHER PUBLICATIONS

Thomas Hoffman/Warehouse Management/Mar. 6, 1995/Computer World.
URL:http://www.Buyitouline–Com/1996/Net Presence, Inc.
URL:http://www.Jems.gov.au/Australian Government Publishing Service.
HD Computers/Home Shopping/Nov. 6, 1995/Microtimes.
Borland International Inc./Paradox for Windows/1992/pp. 290, 269 Users Guide.
McCord/Developing Windows Applications with Borland Ett/1992 p. 156.
Norton/PC Programmer's Bible/1985/pp. 166, 167, 168, 169, 170, 171, 172, 173, 174.

*Primary Examiner*—Kevin J. Teska
*Assistant Examiner*—Matthew Loppnow

[57] ABSTRACT

A computer system that utilizes client/server software to allow users of the client software to log into a server and publish information about a product or service. Once the information is published, other users of the client software may log into the server to browse or search for the information. This system is designed to help extractors and manufacturers of products, as well as service providers, to advertise their product or service to other extractors, manufacturers, service providers, distributors, retailers or other consumers to help aid in the distribution of those products or services. The system is also designed to help reach these establishments over a wide area, limited only by communication networks, and the system is kept current through the use of the established users of the client allowing rapid change.

1 Claim, 7 Drawing Sheets

| New Ad Information | | x |
|---|---|---|
| Contact Name: ☐ | Company County: ☐ | |
| Company Name: ☐ | Company Product: ☐ | |
| Company Address: ☐ | Company Service: ☐ | |
| Company City: ☐ | Graphic or Logo: ☐ | |
| Company State: ☐ | Price: ☐ | |
| Company Zip Code: ☐ | Min. Qty.: ☐ | |
| Additional Info. Text File: ☐ | | |
| Company Phone: ☐ | | |
| Company Country: ☐ | | |
| | Keywords: ☐ | |
| OK | | |

Fig 2B

| View Ad | ☒ |

Address:
Phone Number:
Contact:
Item:
Cost:
Min Qty:

23 → Additional Info.   OK

Fig 2E

SOFTWARE AND HARDWARE FOR PUBLISHING AND VIEWING PRODUCTS AND SERVICES FOR SALE

BACKGROUND—FIELD OF THE INVENTION

This Invention relates to software that works with electronic hardware, specifically to product and service inventory database systems.

BACKGROUND—DESCRIPTION OF PRIOR ART

Businesses usually require products and services in order to operate. A business may need services like phone installations, copy machine repairs, EPA tax form preparations or other forms of outside help. A business may also need products. For example, a grocery store would need to find produce like oranges and tomatoes. A service oriented business survives by selling it's services. For example, if a chrome plater needs EPA tax forms filled out for hazardous waste, a certified tax specialist might offer the service to the chrome plater for a profit. A product oriented business like a farmer might offer produce like tomatoes to a grocer.

Traditionally business transactions are done through buyers and sellers. When a business needs a product or service (buyer) then they usually look in the yellow pages for somebody who can supply that service (seller). Sometimes the scope of the yellow pages is too narrow for the transaction to occur. If a gardener needs a trailer to hold their equipment, they may find that there are no trailer manufacturers in the range of the yellow pages. A business may also find it hard to use the yellow pages when looking for a specific product. The gardener that needs the trailer may have to look under welders, trailers or automotive, but not know it.

Another technique that businesses use for buying and selling is searching through a data base such as selectPHONE™ BOOK from ProCD Inc. These types of data bases allow searches to be done by business name, SIC, city, state, zip code or phone, but not by product or service.

When a business wants to market a product or service, they advertise that product or service to try to let other businesses or consumers know what it is that they are offering. There are many ways for a business to market their product or service. One way is to place a classified advertisement on a computer data base system. Most networks and online services like Prodigy® offer these classified services. These systems usually place the advertisement into a category or sub-categories. This method allows the client (client is interchangeable with user, workstation, terminal or browser and server is interchangeable with host or mainframe) of the system to browse through a certain category to view the classified advertisement. Some systems will even allow the client to search for keywords in the subject of the classified advertisement. These types of systems don't allow the flexibility of limiting by location or give accurate product or service results, therefore, require much time to browse from advertisement to advertisement.

Another method businesses use to market their products or services on the computer is to either use their own computer catalogue systems or have a service provider place the product or service on an existing computer catalogue system. Online catalogues can be found in the marketing sections of online services like America Online®. Businesses also start their own online catalogues on the world wide web, like HD Computer at http://www.hdcomputer.com. There are also many services on the world wide web like Buy It OnLine at http://www.buyitonline.com that will allow businesses to advertise there products or services for sale. These services allow the client to search by keyword or browse through the categories. The problem with these services is that none of them allow the client to publish (publish and published are interchangeable with upload or sending data from client to server) the product or service online. The world wide web sites can't be browsed unless the web address is known. There are data bases on the world wide web like the WebCrawler® at http://www.webcrawler.com that allow the client to enter a search string in order to get a web address. These data base systems utilize the client-server technology that allows the client to enter information, but none of them allow the client to enter information about their product or service.

Many computer based inventory systems have been developed to help businesses track their inventories. An example of this type of inventory system is the one developed by Computer Associates International Incorporation for warehouse management called CA-Warehouse Boss. Other inventory management systems include the factory floor management system described in U.S. Pat. No. 5,398,336 to Tantry and a point of sale tracking system attachment described in U.S. Pat. No. 5,396,417 to Burks. Since these systems can be costly to most small businesses, these businesses may develop their own inventory systems using less expensive data base development applications. Most of these inventory systems allow the data to be exported into some compatible delimitated text format. The problems with these inventory systems is they are designed to be used for the individual business, so that products or services from one business inventory are not shared with another business inventory.

All of these systems or methods lack in the ability of the client to publish information for access by other clients.

OBJECTS AND ADVANTAGES

Several objects and advantages of the present invention are:

(a) to provide allowance of a product or service to be published by a client so that other client machines may view the data;

(b) to provide allowance of many products or services to be published by a client so that other client machines may view the data;

(c) to provide allowance of the published data to be separated and stored on a server, so that the data can be called by it's separated component, therefore saving time searching data;

(d) to provide links on the separated components so that the remaining components may be called from the separated components;

(e) to provide allowance of a method for searching for a component of published data; and (f) to provide allowance of a method for browsing through components of published data.

The above objects and advantages taken from components of prior art with the added objects and advantages of being able to publish information about products or services have been combined to produce a unique client-server environment for the marketing of inventories and services. The published data can include information components such as minimum purchase quantity, price, contact person, city or other relative information. The advantage of separating these components with links would allow a client to search through a component data base on the server based on price and product, which is a method relational data bases use to speed up the search process, and it also allows a method of getting other associated information. Still further objects and advantages will become apparent from a consideration of the succeeding description and drawings.

DRAWING FIGURES

In the drawings, the client software windows have the same number but different alphabetic suffixes.

FIGS. 2A to 2F show some of the windows of the client software.

REFERENCE NUMERALS IN DRAWINGS

| | |
|---|---|
| 1 client | 2 separating data |
| 3 data components | 4 server |
| 5 new link process | 6 link storage |
| 7 data-link storage | 8 search request |
| 9 search results | 10 login button |
| 11 advertise button | 12 search buttons |
| 13 browse button | 14 inventory button |
| 15 category edit box | 16 category file edit box |
| 17 category file type combobox | 18 keyword search edit box |
| 19 keyword search button | 20 limit search button |
| 21 result listbox | 22 view ad button |
| 23 additional information button | |

Figure 1:
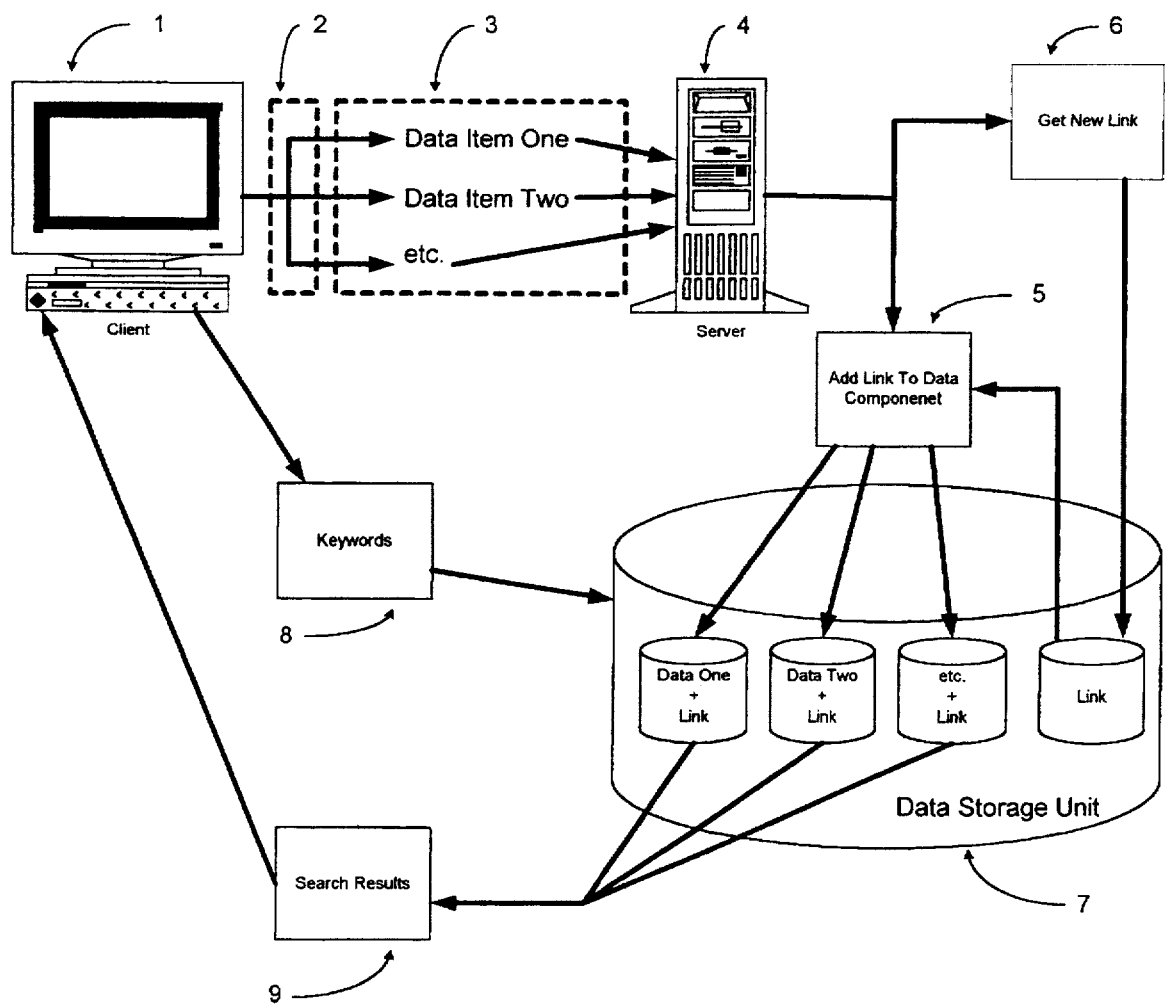
FIG. 1 shows how the client and server interact.
Figure 2A:
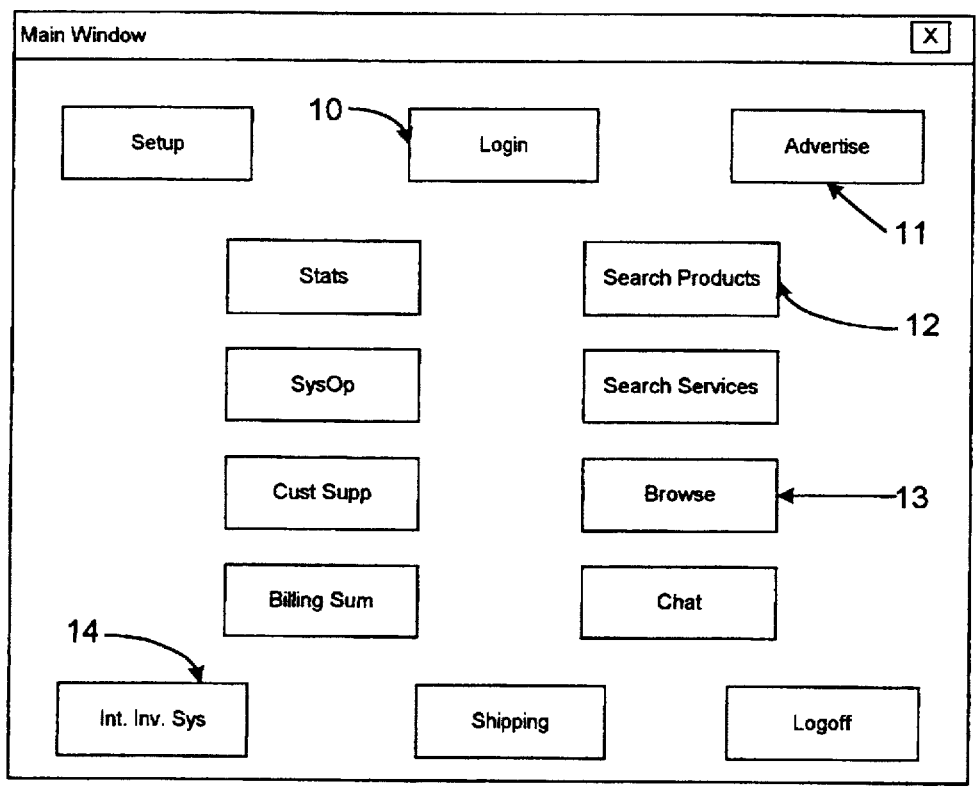
Figure 2C:
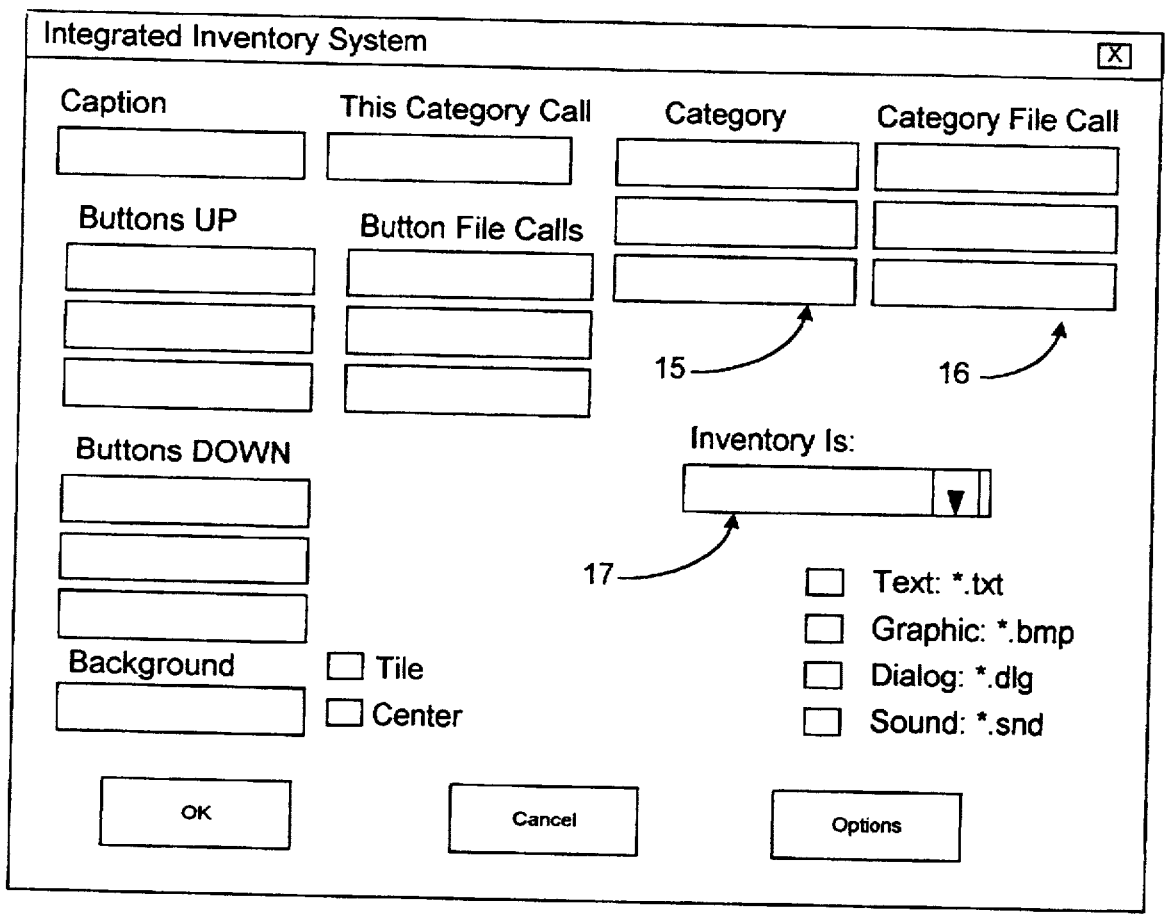
Figure 2D:
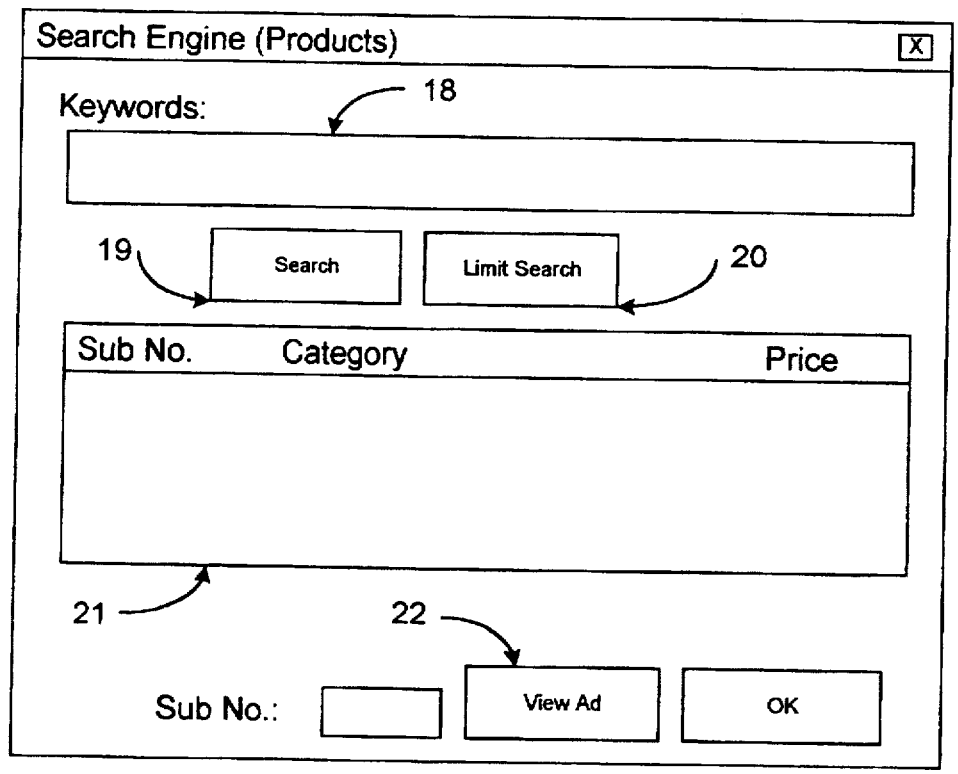
Figure 2F:
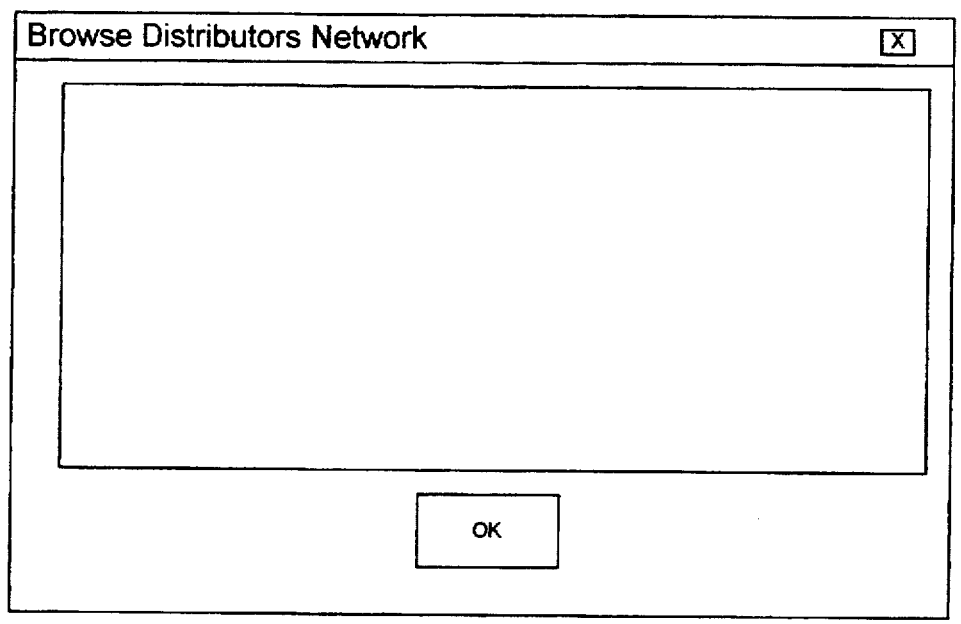

Description—FIGS. 1 to 2F

An explanation of the operation of the equipment of the invention will be described with reference to these drawings:

FIG. 1 is a block diagram describing how the software and hardware components are connected and how they operate.

FIGS. 2A to 2F are drawings of the client windows, which allow the client to enter, search and retrieve data.

Operation—FIGS. 1 to 2F

The fundamental hardware and operational design for the current invention are illustrated in FIG. 1. The hardware design is very typical of the client/server (or terminal/host) communications design. Two computers are used to communicate information. One computer acts as the server 4 and the other acts as the client 1. The server includes a hard drive, which is used to store data in a similar process of a tape system described in U.S. Pat. No. 4,932,826 to Moy. The Distributors Network is unpublished software (at the time of submittal of this document) that is unique to this invention and is made up of two components. One component is client software which runs on the client computer and the other component is server software which runs on the server computer. The client and server software are specifically designed for this invention and use modems as the method of communication. Some of the dialog windows of the client software are illustrated in FIGS. 2A to 2F.

Most of the features of operation are typical of communications software on the market today. The client logs into the server by pressing the login button 10 illustrated in FIG. 2A. Once communications between the client and server have been established, the client may publish information or search for previously published information.

The client may publish information about a product or service by selecting the advertise button 11. This operation calls the dialog illustrated in FIG. 2B. The client may enter all the necessary information about the product or service, including a contact person, the companies name, address and phone number, keywords describing the product or service, price, minimum quantity, a text file which contains additional information about the product or service and the product or service. The client can select the "OK" button to send this information to the server.

The data is separated by component 2 and packaged into several strings, which contain the component data along with information about the client. The packaged strings are communicated 3 to the server 4. The server obtains a new link 6 from a file on the hard drive and adds it 5 to each of the component strings 3 that were sent from the client. Each data component and link are stored in individual files 7 on the hard drive. This is similar to how a relational data base works.

By selecting the search products button 12, the client may search for a product or service. This operation will call the dialog illustrated in FIG. 2D. From this dialog the client can enter a keyword or keywords. By pressing the search button 19, the result window is cleared and the keywords 8 are sent to the server 4. The server 4 searches the files 7 on the hard drive until it reaches a match to the keywords or until it reaches the end of the files.

If the server 4 obtains a match, then it will retrieve the link for that match. The server 4 will search through the category and price files for the link in order to obtain the components associated to the matching keywords. The server 4 will communicate 9 the resulting link, category component and price to the client 1. The client 1 will display the resulting information in the result box 21. If the server 4 gets to the end of the files without finding a match, then it will communicate 9 that no match was found to the client 1.

If too many results are displayed in the result box 21 then selecting the limit search 20 button will allow the resulting data to be limited to linked criteria, for example by city or state.

Based on the information displayed in the result box 21, the client 1 may select one of the results displayed and press the view ad 22 button. This will communicate to the server 4 that the client would like to obtain more information about the product or service. The server 4 will then continue to search through all files 7 for the matching link in order to retrieve additional information associated to the result. The server 4 will communicate 9 the additional information to the client 1. Then the client 1 will display the dialog illustrated in FIG. 2E. By selecting the additional information 23 button, the client will display the associated text file.

In order to submit multiple product or service data, the integrated inventory system 14 button is used rather than the advertise 11 button illustrated in FIG. 2A. The communication for this procedure is similar to what has already been described, since this is common to most client/server data base processes. Pressing the integrated inventory system 14 button calls the dialog illustrated in FIG. 2C. Rather than manually entering in data about multiple products or services, the client 1 will communicate 9 to the server 4 an entire file containing the information.

The reason for this is that multiple information is expected to come from the client owners (businesses) own inventory system. The businesses inventory system allows the client owner to export their inventory to a file. If the business has multiple products and multiple categories of these products, then different files can be created for each category. The client owner may enter a category in the category edit box 15 and the file name containing the exported data into the category file call edit box 16. Since different inventory systems will export the inventories to many different types of formats, it is important for the server 4 to know how to separate the data from the exported inventory file of the client owner. The drop down list box 17 allows the client owner to select a format (for example, delimitated text) that matches the format that their inventory system uses.

Instead of searching for a product or service by keyword, the client software offers a browse feature. By selecting the browse 13 button illustrated in FIG. 2A, the dialog illustrated in FIG. 2F is displayed. This dialog list box displays either predefined categories or categories submitted by the client 1, which are retrieved from the server 4. By selecting a broad category the dialog updates and narrows down the category list until the resulting data is displayed.

Summary, Ramification, and Scope

Accordingly the reader will see that the design of this invention is very useful for publishing products and services. The invention is a tool that aids in the distribution of products formed from extraction or manufacturing processes and for advertising information about services. Businesses and consumers will be able to utilize this invention in order to quickly, easily and cost effectively find available resources and relative information. In addition, the client maintained data base will insure accurate information. Furthermore, this system has further advantages in that

- it provides allowance of a product or service to be published by a client so that other client machines may view the data;
- it provides allowance of many products or services to be published by a client so that other clients may view the data;
- it provides relational links so that the data may be searched for quickly without having to go through all of the related information;
- it provides a method for searching for a component of published data; and
- it provides a method for browsing through categories of published data.

The scope of this invention should not be limited to the description above. Many specificities have been described and should only act as an illustration of the operation of the invention. Many variations can be constructed, for example, the server may be constructed of multiple computers like the system described in U.S. Pat. No. 4,811,207 to Hikita. Another variation could be the use of the internet for communications rather than a modem and telephone lines.

Thus the scope of the invention should not be determined by the example given, rather it should be determined by the appended claims.

I claim:

1. A system for publishing information of and relating to products and services to a remote computer data base system acting as a server from a computer system acting as a client via a communication system comprising:

client software means operating on said computer system acting as a client, server software means operating on said remote computer data base system acting as a server, new ad information means for allowing a client to enter information about said products or said services into said remote computer data base system, dialog maker means for allowing said client to communicate an entire file containing information to said server, search engine means for allowing said client to search data in said remote computer data base system and displaying resulting information, and view ad means for allowing said client to retrieve additional data from said remote computer data base system corresponding to said resulting information.

\* \* \* \* \*